US 6,754,647 B1

(12) United States Patent
Tackett et al.

(10) Patent No.: US 6,754,647 B1
(45) Date of Patent: Jun. 22, 2004

(54) METHOD AND APPARATUS FOR HIERARCHICALLY DECOMPOSED BOT SCRIPTS

(75) Inventors: Walter Tackett, San Francisco, CA (US); John B. Hodges, Moss Beach, CA (US); Scott Benson, Daly City, CA (US); D. Patrick Blair, San Pablo, CA (US); Kate Boynton, San Francisco, CA (US); Ray Dillinger, Richmond, CA (US); Martin Eggenberger, Piedmont, CA (US); Tom Schofield, San Francisco, CA (US)

(73) Assignee: Verity, Inc., Sunnyvale, CA (US)

( * ) Notice: Subject to any disclaimer, the term of this patent is extended or adjusted under 35 U.S.C. 154(b) by 457 days.

(21) Appl. No.: 09/670,478

(22) Filed: Sep. 26, 2000

(51) Int. Cl.[7] .......................... G06F 9/44; G06F 15/18; G05B 19/04

(52) U.S. Cl. .............................. 706/52; 706/8; 706/20; 700/246

(58) Field of Search .............................. 706/8, 20, 52, 706/1, 15, 9; 700/245, 246

(56) References Cited

U.S. PATENT DOCUMENTS

| | | | | | |
|---|---|---|---|---|---|
| 4,965,763 | A | * | 10/1990 | Zamora .......................... | 704/1 |
| 5,237,502 | A | * | 8/1993 | White et al. .................... | 704/1 |
| 5,386,556 | A | * | 1/1995 | Hedin et al. .................... | 707/4 |
| 6,061,646 | A | * | 5/2000 | Martino et al. ................. | 704/3 |
| 6,078,917 | A | * | 6/2000 | Paulsen et al. ................. | 707/6 |
| 6,259,969 | B1 | * | 7/2001 | Tackett et al. ............... | 700/264 |
| 6,314,410 | B1 | * | 11/2001 | Tackett et al. ................ | 706/11 |
| 6,363,301 | B1 | * | 3/2002 | Tackett et al. .............. | 700/246 |
| 6,532,401 | B2 | * | 3/2003 | Tackett et al. .............. | 700/245 |
| 2002/0156551 | A1 | * | 10/2002 | Tackett et al. .............. | 700/245 |

OTHER PUBLICATIONS

Pateras et al., "Understanding Referring Expressions in a Person–Machine Spoken Language", 1995 International Conference on Acoustics, Speech and Signal Processing, vol. 1, pp. 197–200, May 1995.*

Korn, J., "System Modelling with Natural Language and Fuzzy Logic", IEE Colloquium on two Decades of Fuzzy Control–Part 2 May 1993.*

Lange et al., "Simulating Hybrid Connectionist Architectures", Proceedings of the 1989 Winter Simulation Conference, pp. 569–578, Dec. 1989.*

Tackett, W.A., "Mining the Genetic Program", IEEE Expert, vol. 10, Iss. 3, pp. 28–38, Jun. 1995.*

(List continued on next page.)

*Primary Examiner*—Wilbert L. Starks, Jr.
*Assistant Examiner*—Kelvin Booker
(74) *Attorney, Agent, or Firm*—Morrison & Foerster LLP

(57) ABSTRACT

Method and apparatus are disclosed for the development and implementation of virtual robot's (bot's) directed natural language interaction with computer users. Bots employing the present invention base natural language interaction on a predefined universe of discourse that is decomposed hierarchically into domains. A data structure provides a storage area for each domain. The data structure may reflect the hierarchical decomposition. Domain topics containing program code directing the bot's interaction are placed in domain storage areas. Pattern lists associate words expected to be "heard" by the bot with particular domain topics. Domain topics are provided, as appropriate, to direct a user's attention toward the instant domain's parent, siblings, or children, with lower topics in the hierarchy getting higher preference. Domain censoring and domain tiebreakers improve usability. Universes of discourse developed in accordance with the present invention may advantageously be stored on portable data storage media.

18 Claims, 11 Drawing Sheets

OTHER PUBLICATIONS

Okamato et al., "Inference Method for Natural Language Propositions Involving Fuzzy Quantifiers in FLINS", Proceedings of th 3rd Conference on Fuzzy Systems, vol. 3, pp. 2082–2087, Jun. 1994.*

Mazlack et al., "Recognizing the Most Effective Approximate Reasoning Calculi For a Knowledge–Based System", Proceedings of the 24th Annual Hawaii International Conference on System Sciences, vol. 3, pp. 349–358, Jan. 1991.*

Zadeh, L.A., "Fuzzy Logic=Computing With Words", IEEE Transactions on Fuzzy Systems, vol. 4, No. 2, May 1996.*

Ambriola et al., "An Environment for Cooperative Construction of Natural–Language Requirement Bases", 8th Conference on Software Engineering Environments, pp. 124–130, Apr. 1997.*

Kobayashi, I., "Toward Text Based Information Processing: With An Example of Natural Language Modeling of a Line Chart", 1999 International Conference on System, Man and Cybernetics, Vol 5, pp. 202–205, Oct. 1999.*

Kobayashi et al., "An Analysis of a Fuzzy Algorithmic Tect From the Viewpoint of Daily Language", Proceedings of the 5th IEEE International Conference on Fuzzy Systems, vol. 3, pp. 1573–1578, Sep. 1996.*

Chan, S.W.K, "Inferences in Natural Language Understanding", Proceedings of the 1995 IEEE International Conference on Fuzzy Systems, vol. 2, pp. 935–940, Mar. 1995.*

Park, G., "Linguistic Instruction Based Learning and It's Applications", Proceedings of the 1995 International Conference on Fuzzy Systems, Vol 4, pp. 1891–1896, Mar. 1995.*

Beck et al., "Integrating Natural Language, Query Processing, and Semantic Data Models", 35 IEEE Computer Society International Conference, pp. 538–543, Mar. 1990.*

An et al., "Hiertalker: A Default Hierarchy of High Ordered Neural Networks That Learns To Read English Aloud", IEEE International Conference on Neural Networks, vol. 2, pp. 221–228, Jul. 1988.*

Landauer, C., "Data, Information, Knowledge, Understanding: Computing Up the Meaning Hierarchy", 1998 IEEE International Conference on Systems, Man and Cybernetics, vol. 3, pp. 2255–2260, Oct. 1998.*

Schilder, F., "A Hierarchy for Convex Relations", Proceedings of the 4th International Workshop on Temporal Representation and Reasoning, pp. 86–93, May 1997.*

Tano et al., "Fuzzy Natural Language Communication System–FLINS: Concept and Conversation Examples", Proceedings of the 1995 IEEE International Conference on Fuzzy Systems, vol. 2, pp. 1039–1044, Mar. 1995.*

Kaneen et al., "A Spoken Language Interface to Interactive Multimedia Services", IEE Colloquium on Advances in Interactive Voice Technologies for Telecommunication Services No 1997/147, Jun. 1997.*

Brill et al., "An Overview of Empirical Natural Language Processing", AI Magazine, vol. 18, No. 4, Winter 1997.*

Valverde–Albacete et al., "A Multi–Level Lexical–Semantics Based Language Model Design for Guided Integrated Continuous Speech Recognition", Proceedings of the 4th International Conference on Spoken Language, vol. 1, pp. 224–224, Oct. 1996.*

* cited by examiner

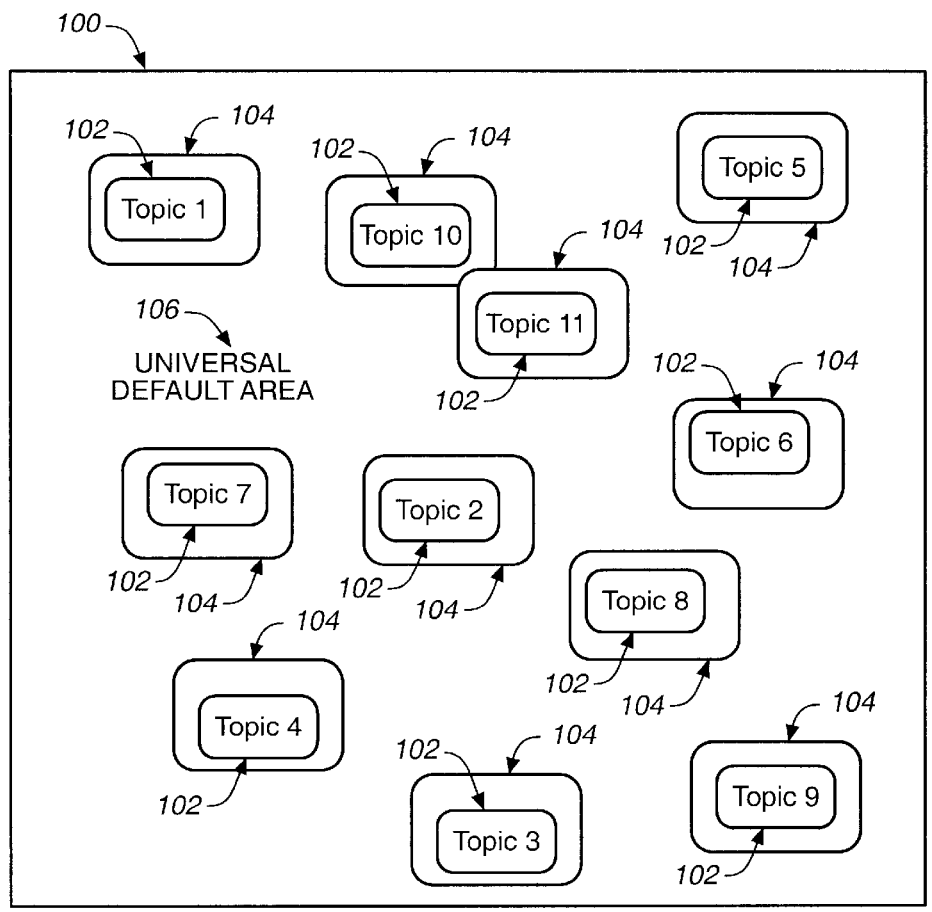
FIG._1 (PRIOR ART)
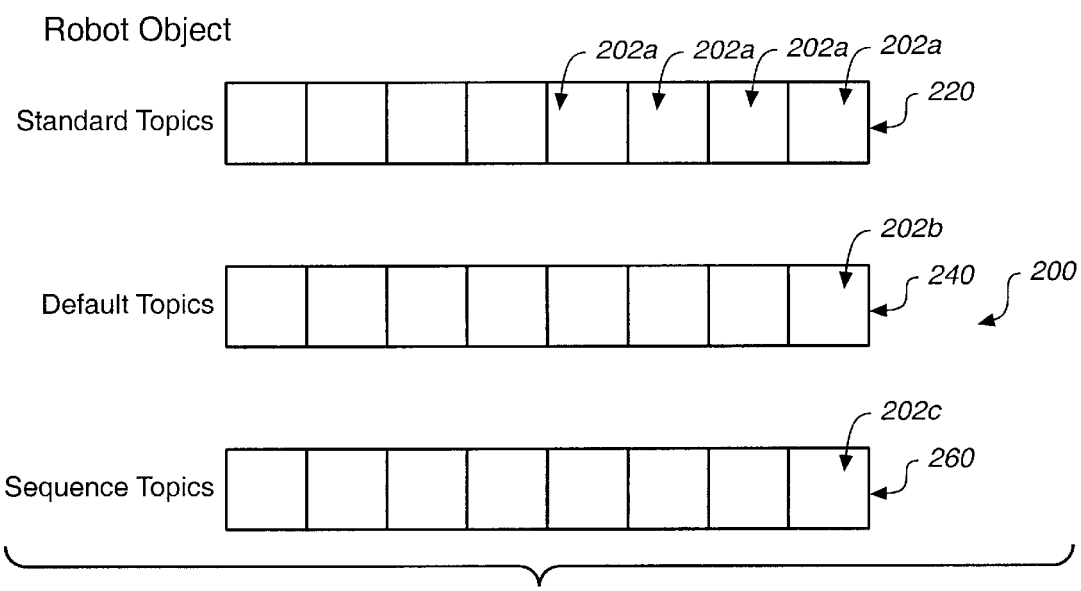
FIG._2

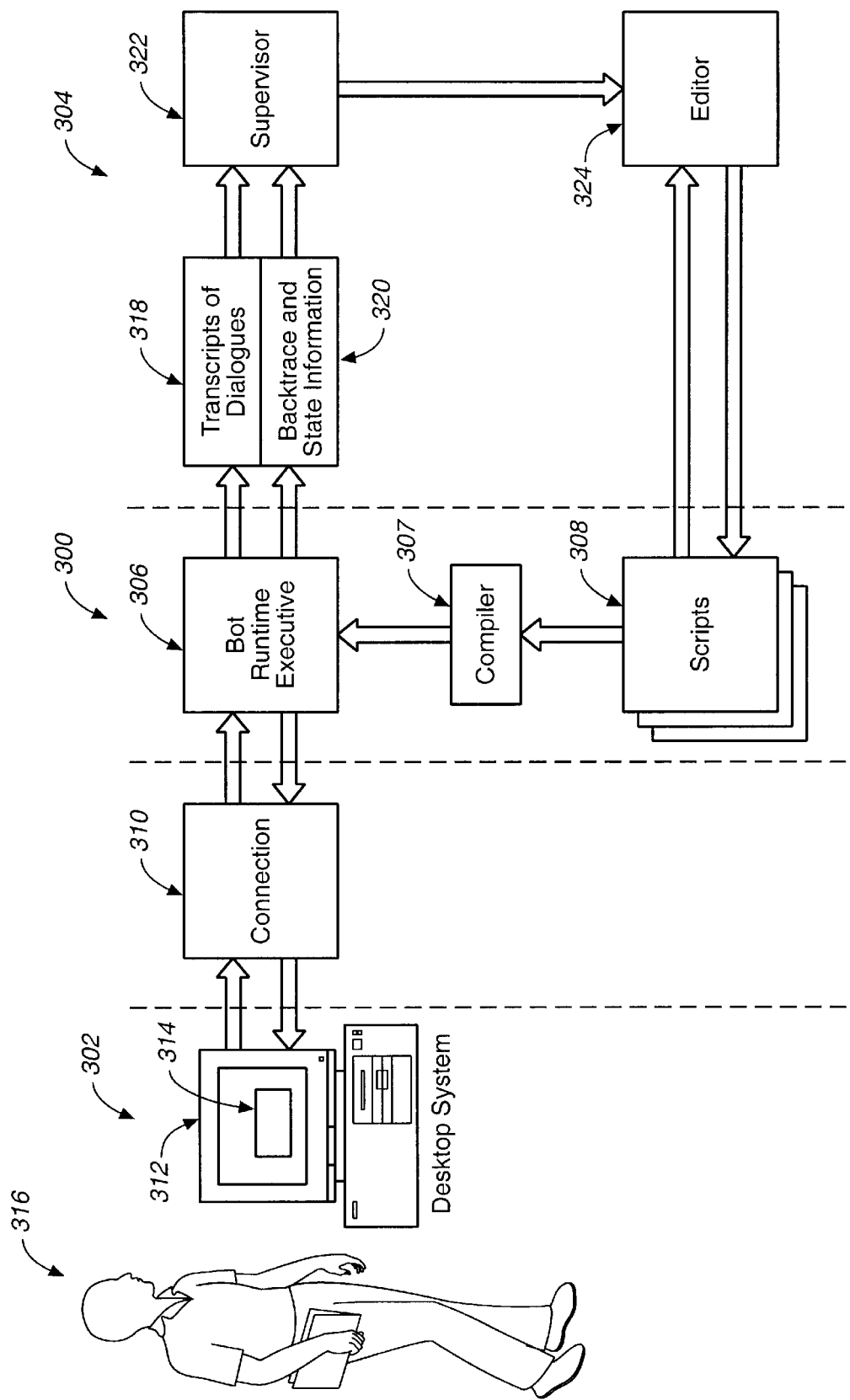

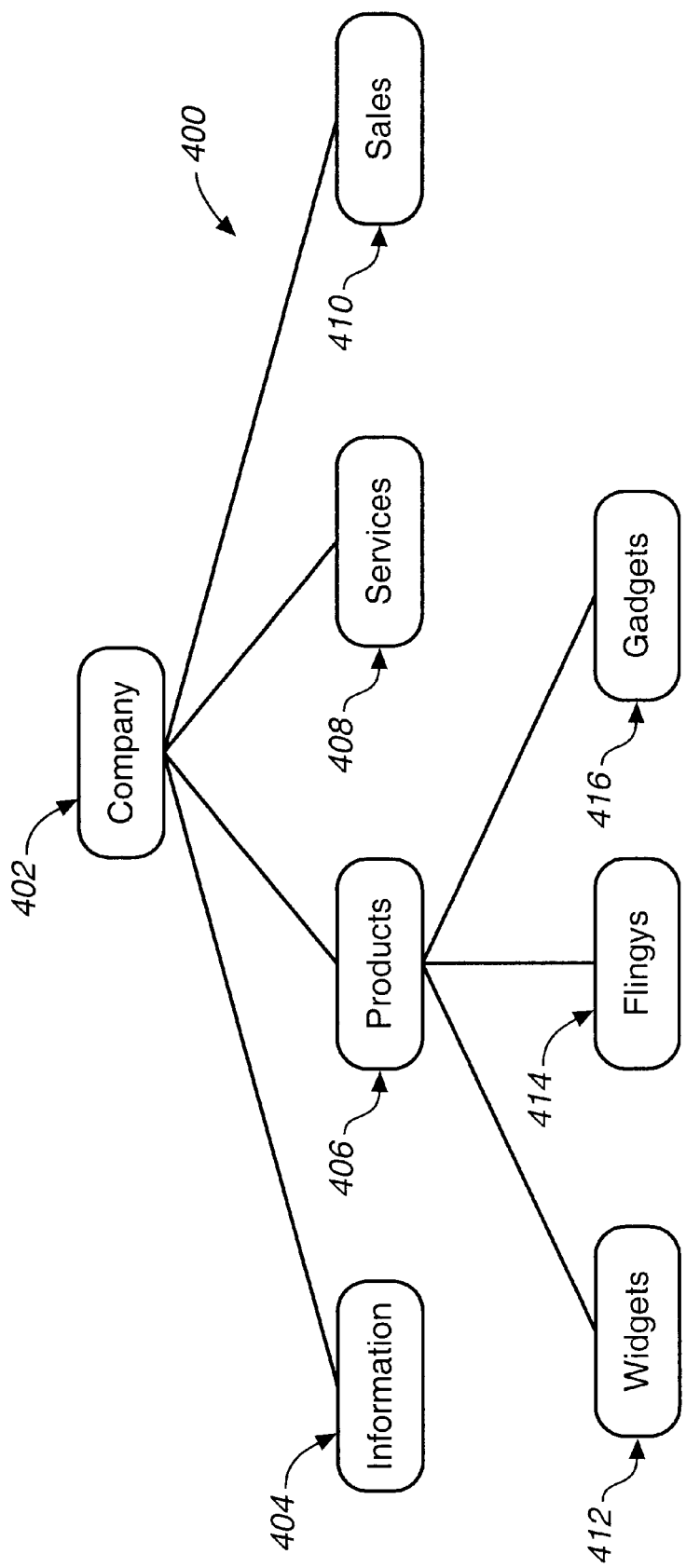
FIG._4

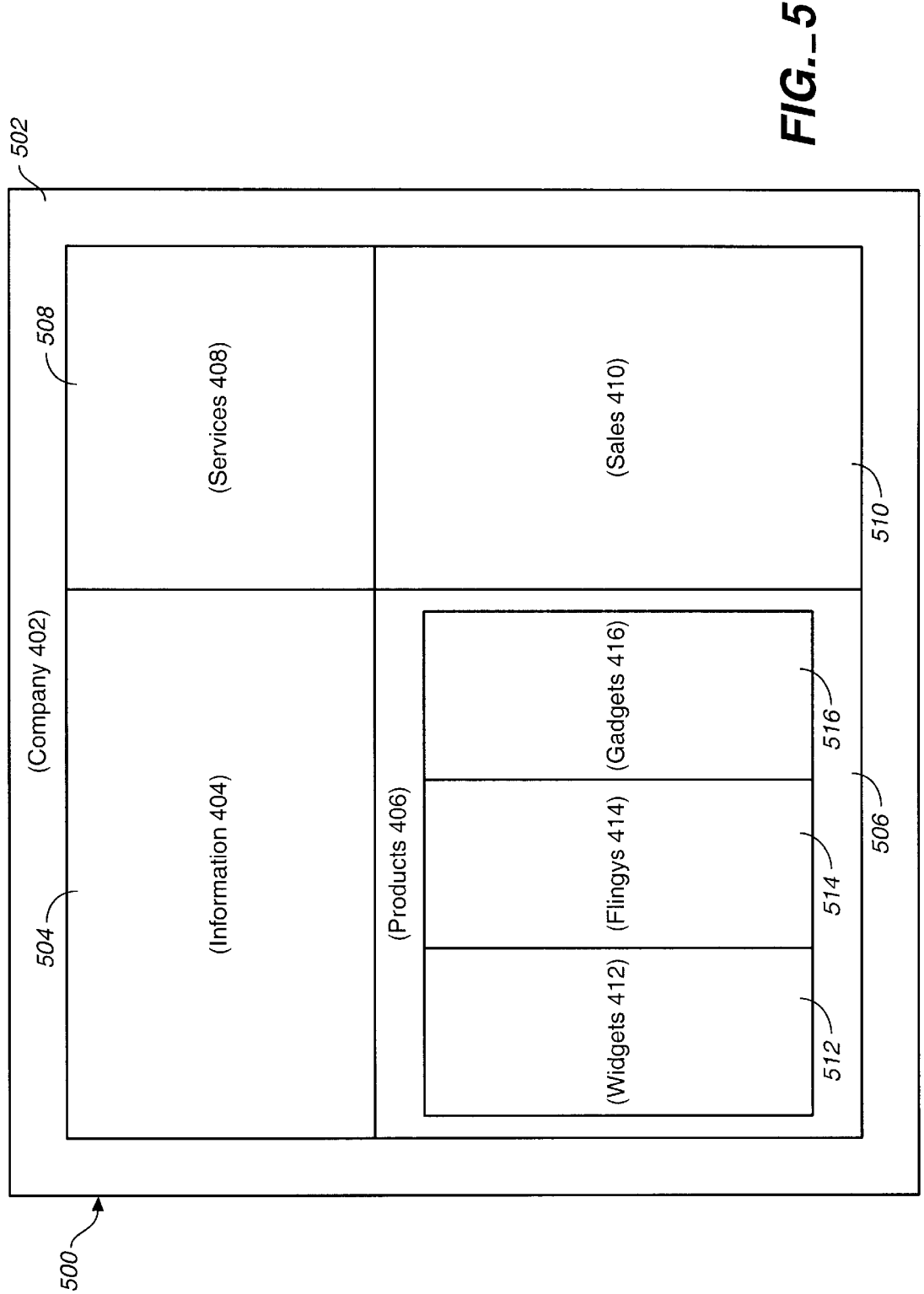
FIG._5

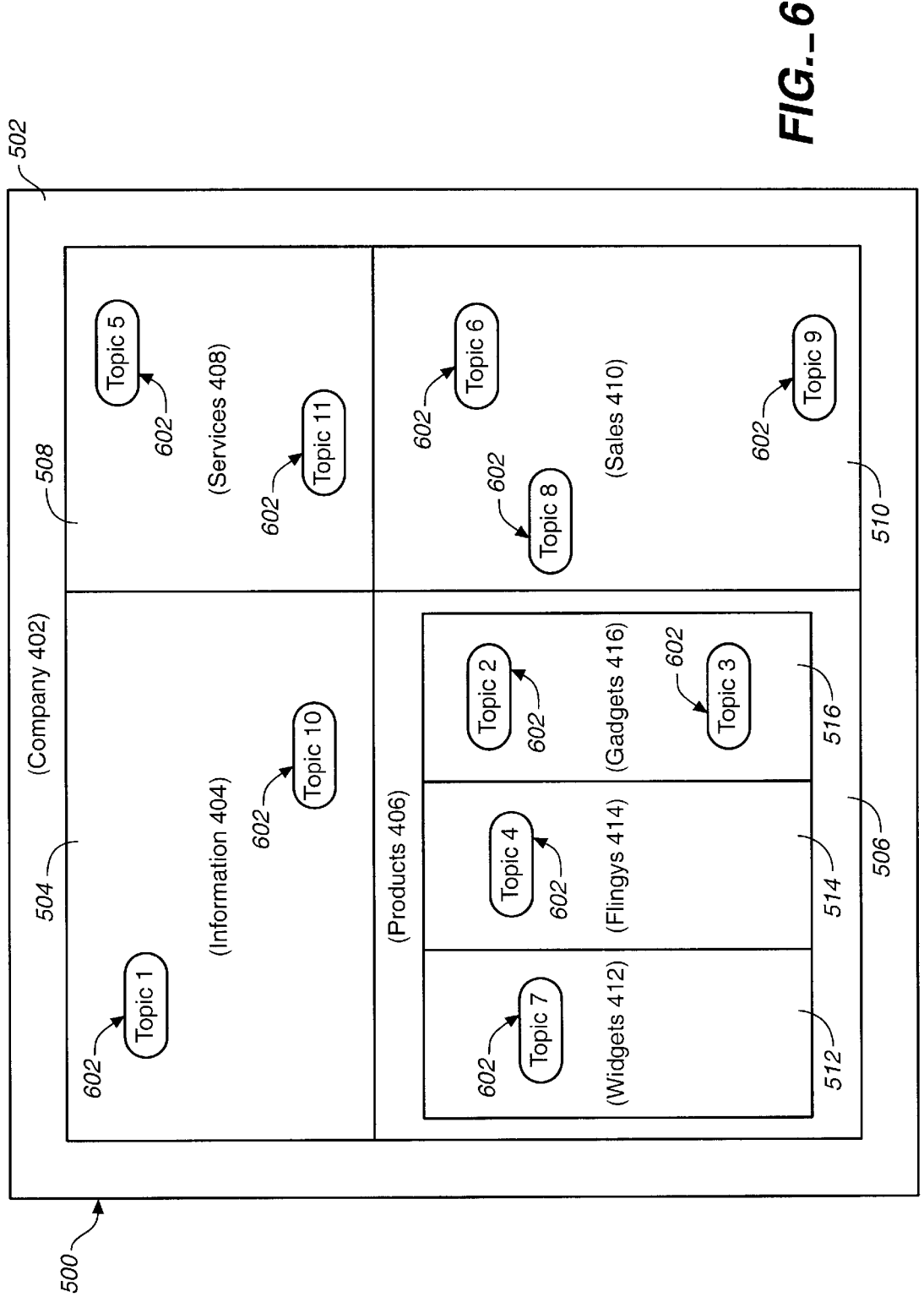

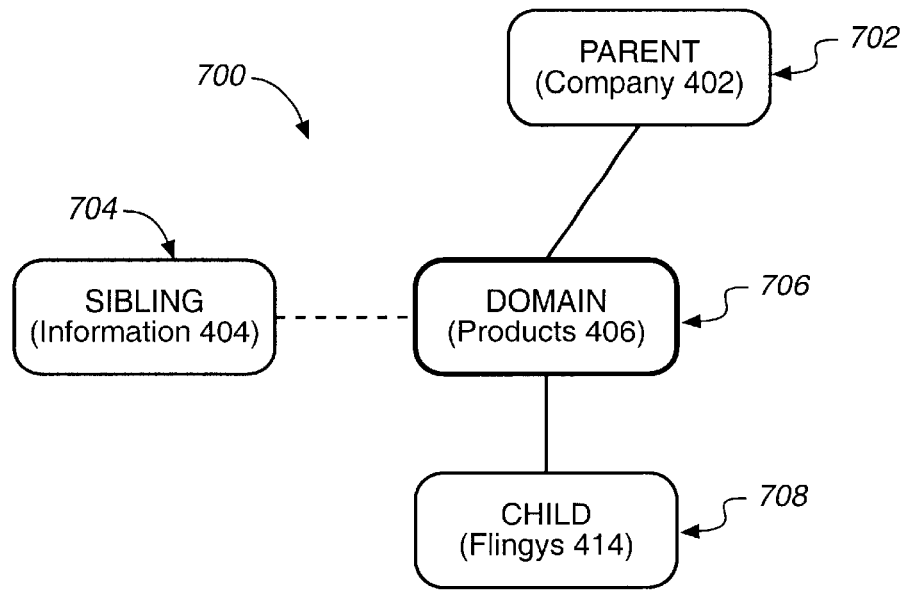
FIG._7
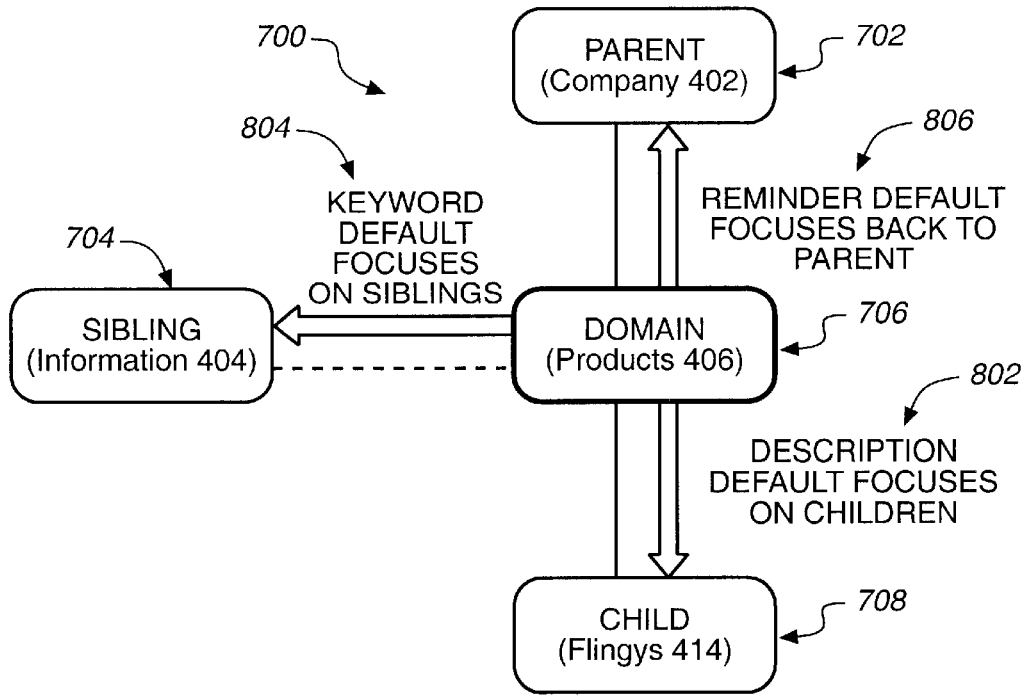
FIG._8

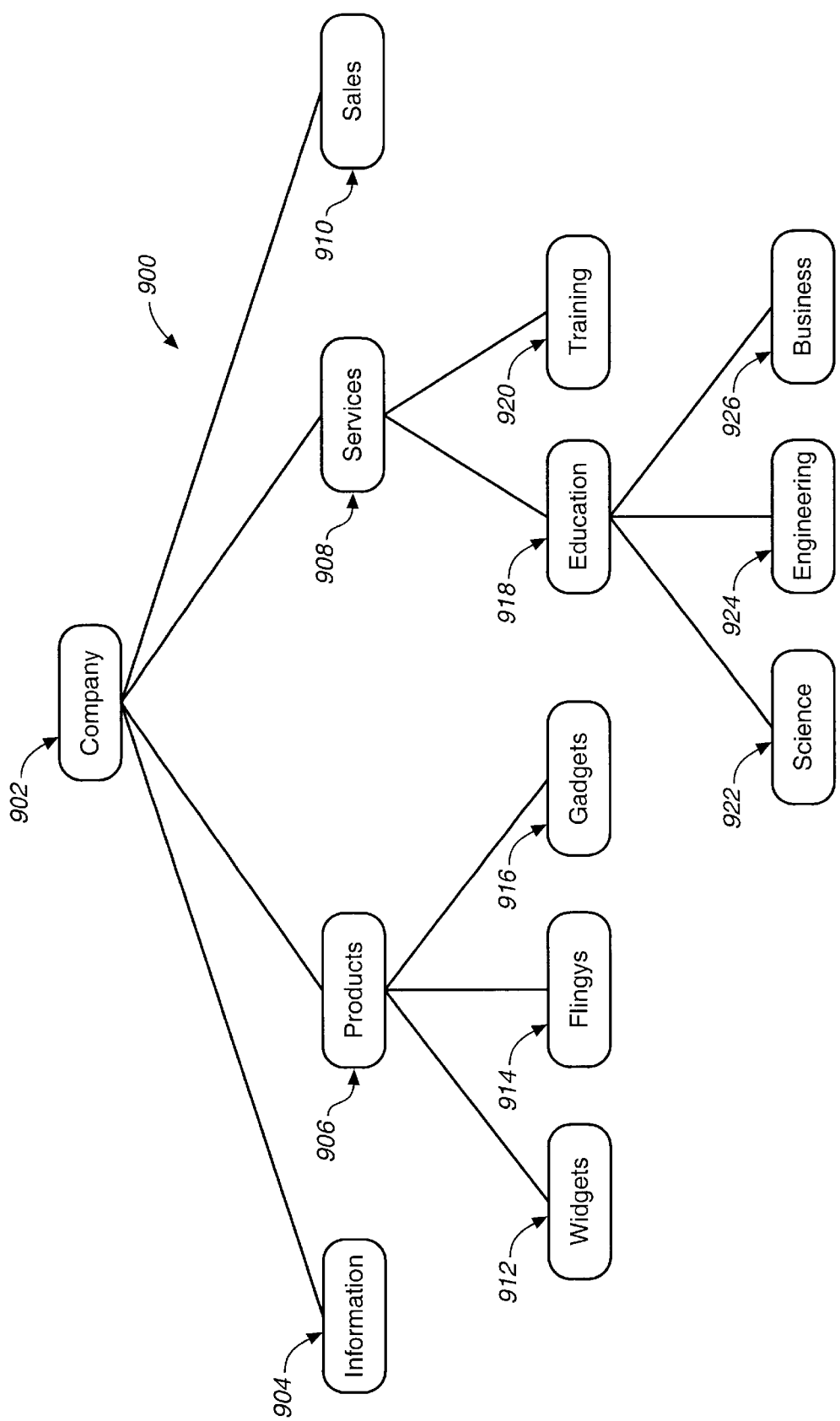
FIG._9

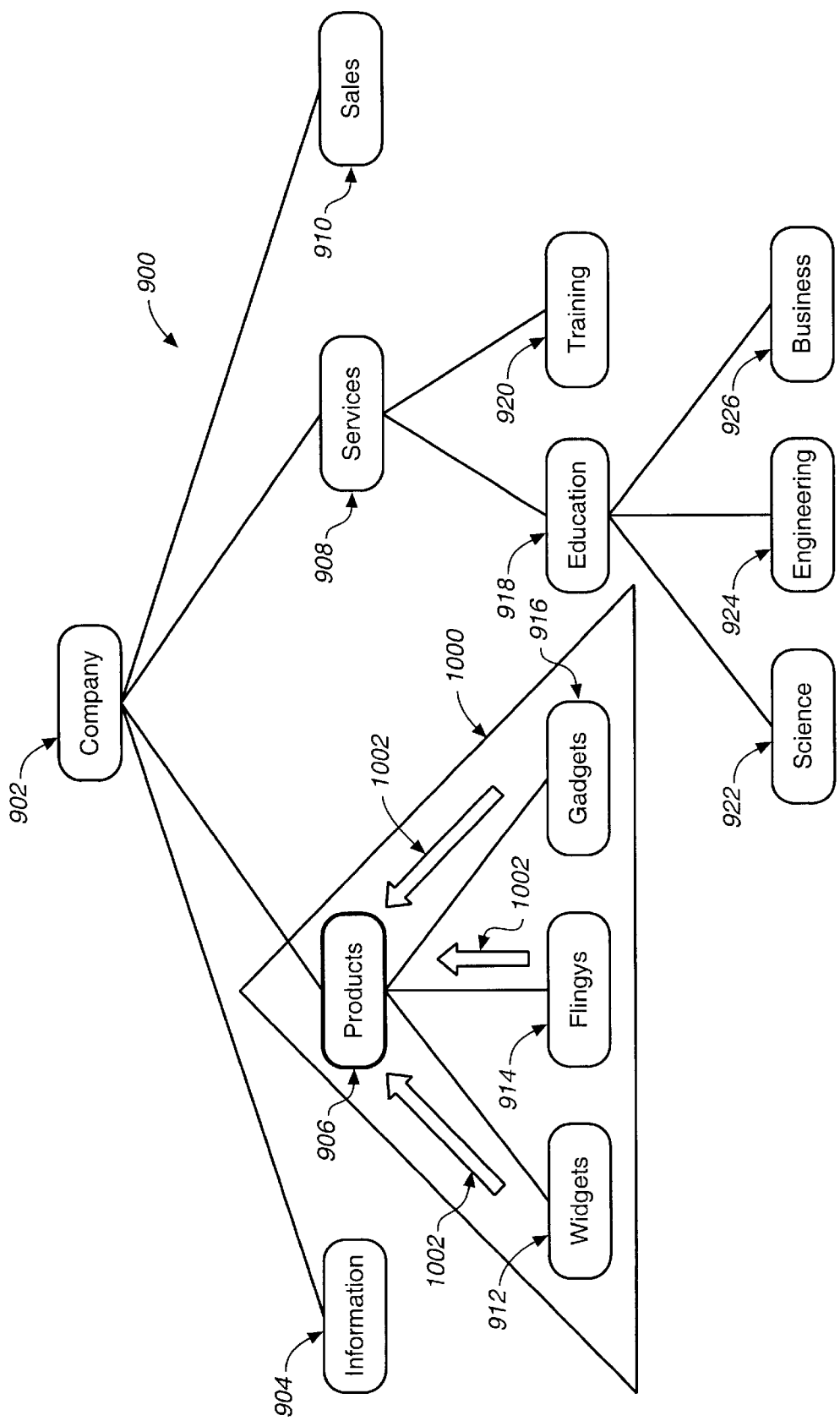
FIG._10

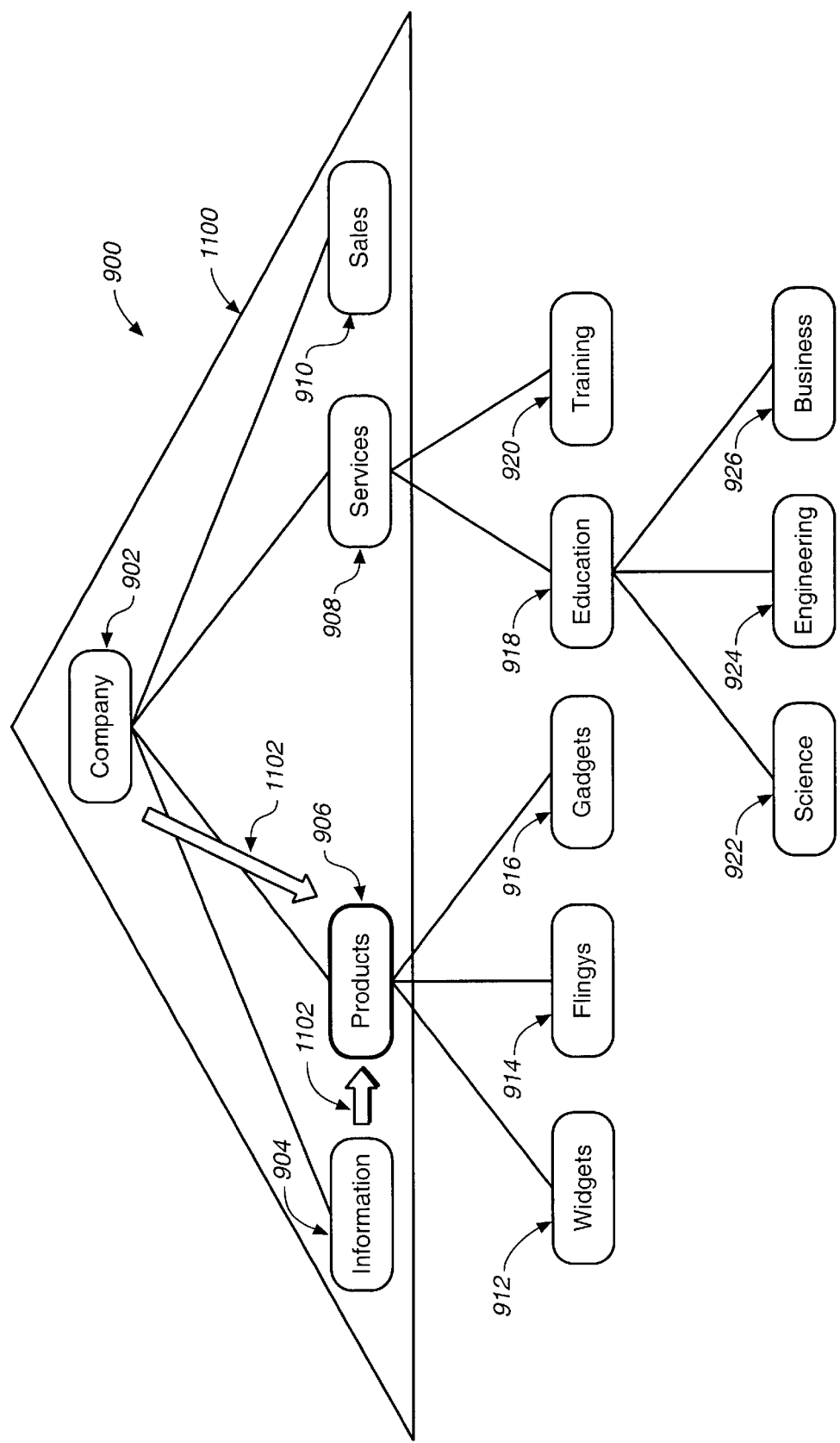
FIG._11

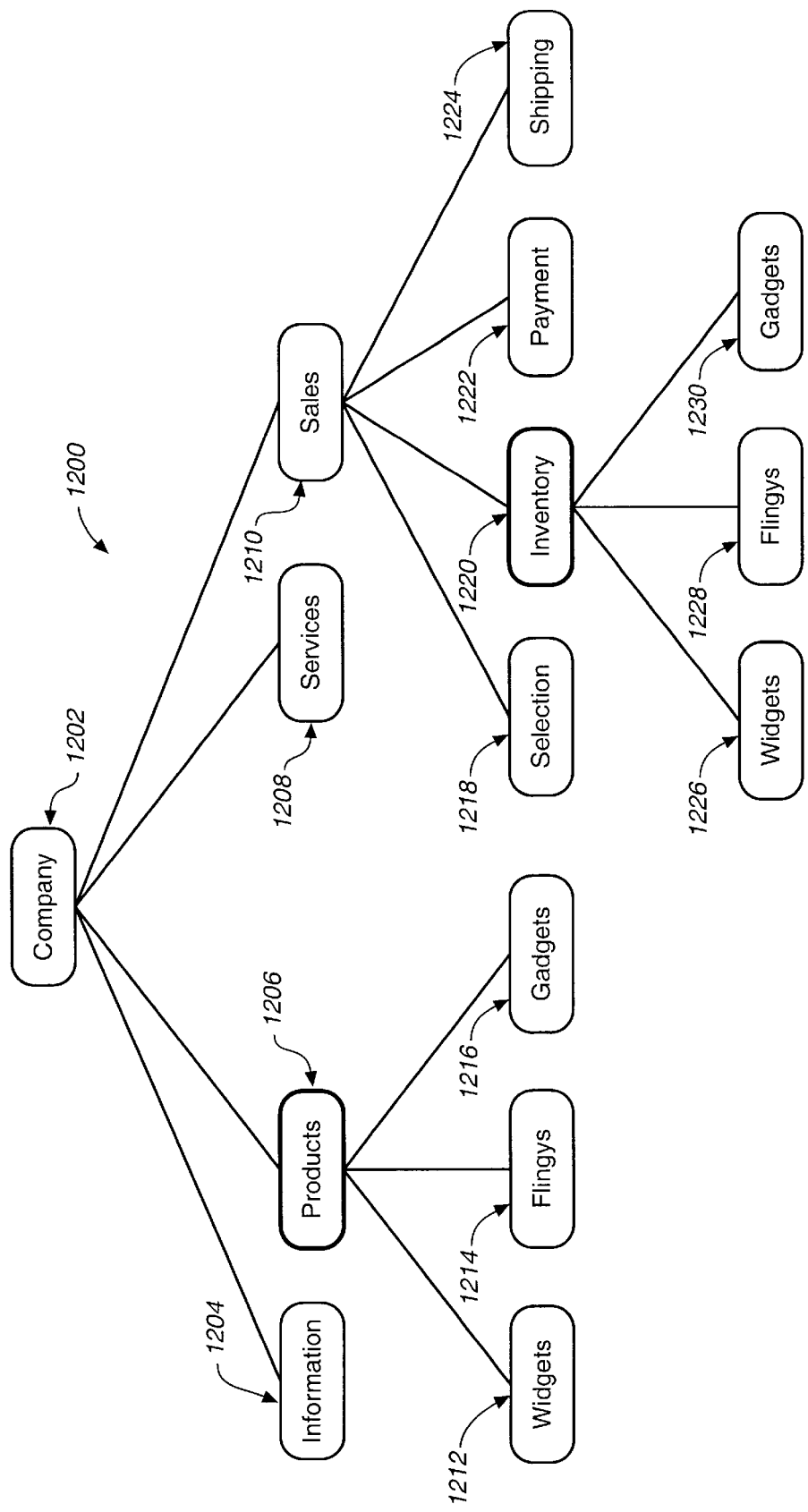
FIG._12

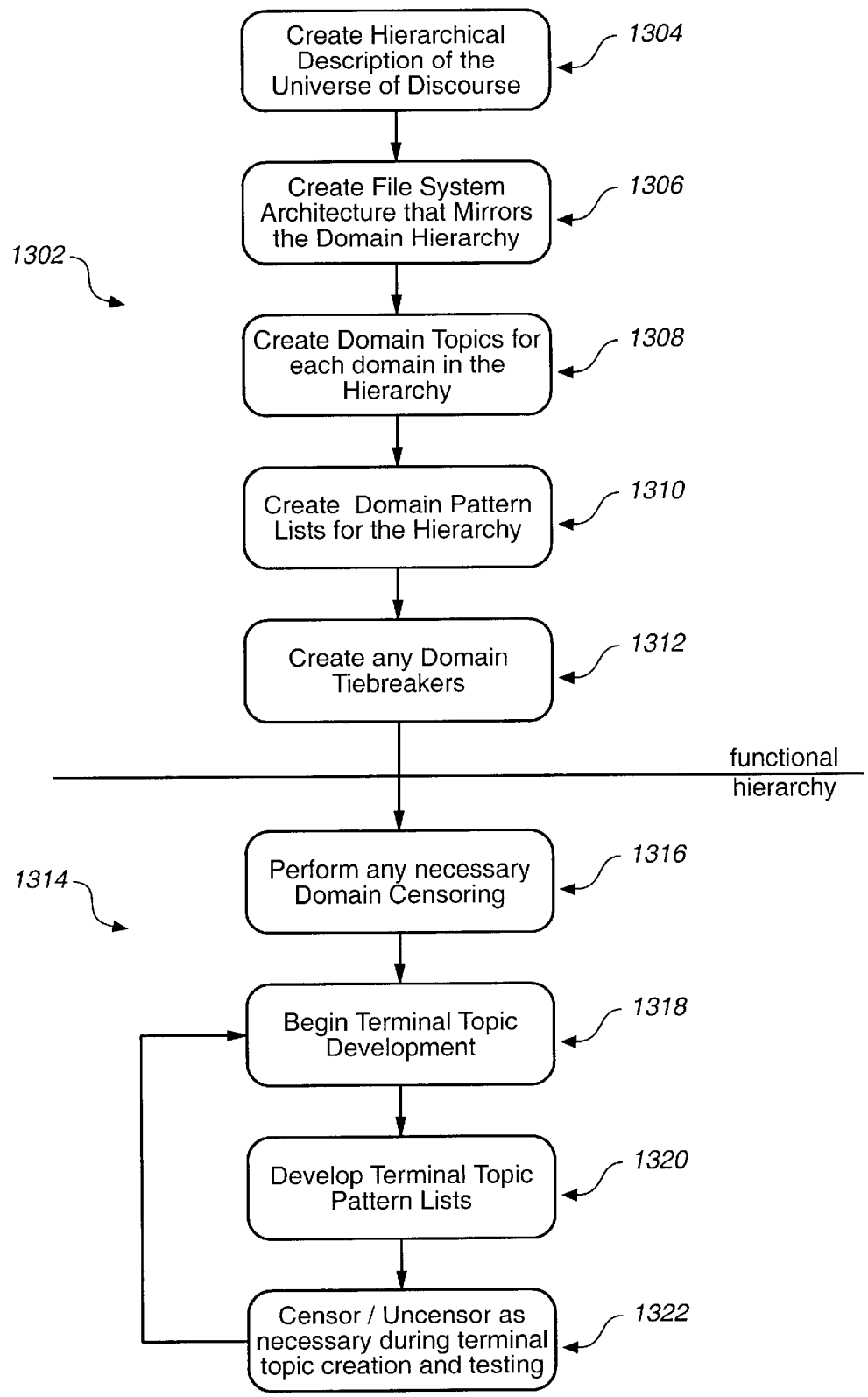
FIG._13

METHOD AND APPARATUS FOR HIERARCHICALLY DECOMPOSED BOT SCRIPTS

BACKGROUND OF THE ART

Understanding and processing natural language, either spoken or written, has long been a goal in the field of artificial intelligence. As computers have been programmed to perform feats, such as defeating the world's best human chess master in his game, other skills exhibited by humans are still seemingly beyond the reach of even the most powerful computers. Although a small child may not be able to play chess, that child has the facility to process and understand its native tongue. Computers, on the other hand, have yet to exhibit any significant level of mastery in the realm of natural language processing.

One attempt at simulating natural language skills is the virtual robot, or bot. A bot is a program that engages in a natural language dialog with a user. A bot may use a scripting language to match input sentences from a user against input templates of keywords. An input template might, for example, take a group of related keywords and lump them together for the purposes of responding. Thus, words like "father," "mother," "brother," and "sister" might be grouped together for a response that relied on the concept of "family." In addition to recognizing familiar words, a scripting language capable of recognizing the ways these words are used in the sentence, and of tracking context across sentences, enables a bot program to track and respond to a wide variety of utterances. Generally, the program that makes use of a scripting language will have a "universal" default response if none of the keyword templates matches the input sentence. Thus the bot always has a response.

A virtual robot generally embodies a particular "universe of discourse" reflective of the subject matter of interest—e.g., a bot developed to converse about personal computers should "know" something about computers and their peripherals. The development of such a bot employs the scripting language to recognize aspects of the subject matter and respond with appropriate content. Often these "scripts" are written in an action-response type style wherein the actual language supplied by the user embodies an "action" to which the "response" is written into the script itself.

Scripts are often written by a bot administrator (possibly a machine) by defining a list of "categories" in which the bot will be well conversant. Categories may comprise "topics" that are recognizable by a runtime executive. Topics, in turn, may comprise patterns or words that are matched against the stream of input communication (in either spoken or written or any other suitable form of communication) from the user.

The main drawback with constructing a virtual bot by a list of categories is that the topics developed cannot provide complete coverage of all subjects in the universe of discourse. The result is that the bot responds with the universal default to some queries that are appropriate in the universe of discourse. Such responses are considered "misses," because the bot demonstrates "holes" in its knowledge of the universe of discourse when it is forced to respond with the default. A related drawback is that the universal default response generally provides insufficient guidance to the user as to their original input: it doesn't provide a knowledgeable response to the input, and it doesn't provide information regarding why the input "confused" the bot.

FIG. 1 illustrates the problem that arises when bot programs incompletely cover the universe of discourse. Universe of discourse 100 represents the relevant body of knowledge in which the bot should be conversant. This includes the entire area of the box labeled 100. When a bot is developed with a list of categories, and implemented with an associated list of topics, only a portion of universe of discourse 100 is represented. FIG. 1 illustrates those topics 102 that have been developed. Each topic 102 potentially has its own default 104 that is related to the subject of topic 102. When the system identifies a query as related to the topic subject, but the query does not match topic 102, then default 104 will be used to construct a response. The universal default 106 represents the total area associated with universe of discourse 100 minus the summed areas of all default 104 areas. All queries that fall into this area (i.e., that miss an implemented topic 102 or its default 104) will be responded to by universal default 106. Since the defaults 104 are related to the topics, rather than to each other, or to universe of discourse 100, hitting defaults 104 or 106 provides the user with little information that would assist in continuing the conversation. There is thus an inherent qualitative problem in developing bots from a list of topics.

Since a bot is a conversational agent, its value derives entirely from how well it interacts with users. In this context, the word "well" may be defined in terms of knowledge content the bot conveys, its friendliness, how easily it is confused, and how much interaction is required for a user to find what is sought. If a user asks questions that confuse the bot, then the bot is perceived as unhelpful and its value is diminished. It is desirable in the bot development task to recognize that the level of quality and value evidenced by users is not judged merely in discrete terms, but rather by the overall impression that they get from their interaction with the bot and by their level of satisfaction with the information the bot provides.

Consequently, there is a need in the art to have a means for easily designing and creating virtual bots that enables a bot to effectively respond to arbitrary utterances with knowledge regardless of the number of topics implemented, guides the user toward providing utterances that will move the user closer to the information they seek, provides the user with information about what in the user's utterance confused the bot when that occurs, and performs these tasks within a framework that eases the maintenance and extendibility of the bot's capabilities.

SUMMARY OF THE INVENTION

Method and apparatus are disclosed related to the development and implementation of virtual robots (bots) directed at conducting natural language interaction with computer users. Bots employing the present invention base their natural language interaction on a predefined universe of discourse. A universe of discourse completely covers the subject matter the bot is intended to address. The complete universe of discourse is broken down, or decomposed, hierarchically. A data management structure is established to provide a storage area for each component of the hierarchy resulting from the decomposition of the universe of discourse. Each such component is called a domain. The data management structure, itself, may reflect the hierarchical decomposition of the universe of discourse. For example, a computer file system with hierarchical directory support may include a directory or subdirectory for each domain, the directories and subdirectories having the same hierarchical relationship as that of the domains they represent. Each directory may then contain discourse content associated with the domain.

Domain topics containing program code to direct the bot's natural language interaction are placed in the storage area for each domain. Pattern lists associate words expected to be "heard" by the bot during natural language interaction with particular domain topics. Domain topics are provided, as appropriate, to selectively direct a user's attention toward other domains. The other domains may be hierarchically related to the first domain as a parent, sibling, or child. Domain topics are constructed in such a way that in conjunction with a specificity-based selection mechanism, the domain topics give preference to children first, siblings second, and parents last, in order to drive the interaction toward the specific information most likely to satisfy the bot user.

Domain censoring allows a domain in the hierarchy to be effectively excluded from the natural language interaction without removing the domain from the hierarchy. Such censoring is desirable for domains whose discourse subject matter is not fully developed and for debugging during development.

Domain tiebreakers intervene in the natural language interaction where it is advantageous to prompt a user to discriminate between two or more domains having logical subject matter overlap between or among them.

Universes of discourse developed in accordance with the present invention may advantageously be stored on portable data storage media for distribution or deployment. Such a media used in conjunction with an appropriate computer creates an operative bot.

BRIEF DESCRIPTION OF THE DRAWINGS

FIG. 1 depicts a universe of discourse in the prior art.

FIG. 2 depicts the topic types used in one implementation employing the present invention.

FIG. 3 depicts an operating environment for an embodiment of the present invention.

FIG. 4 depicts a collection of conceptual domains describing a hierarchically decomposed universe of discourse.

FIG. 5 depicts a uniform distribution of defaults in a universe of discourse associated with the hierarchy shown in FIG. 4.

FIG. 6 depicts a set of developed topics in a uniform distribution of defaults shown in FIG. 5.

FIG. 7 depicts hierarchical relationships of a conceptual domain.

FIG. 8 depicts domain topics for the conceptual domain shown in FIG. 7.

FIG. 9 depicts an expansion of the universe of discourse of FIG. 4.

FIG. 10 depicts the censoring solution for a domain's children.

FIG. 11 depicts the censoring solution for a domain's parent and siblings.

FIG. 12 depicts a tiebreaker scenario.

FIG. 13 depicts a flow chart illustrating one method of developing a universe of discourse for a bot.

DETAILED DESCRIPTION OF THE INVENTION

I. Overview and General Architecture

The term "robot" is used interchangeably with "bot." As used herein, both "bot" and "robot" refer to any program that engages with a human user in conversational interaction. The term "supervisor" is used interchangeably with "administrator." The term "domain" is used to represent a body of knowledge that comprises a component of a universe of discourse in which the bot will be conversant. The term "hierarchy" will be used to describe the collection of domains that represents the universe of discourse that the bot will be designed to converse about. It should be noted that the term "hierarchy" relates to logical relationships and should not be construed to mean the data type or physical organization used to represent the collection. Many means of representing the collection are known to those skilled in the art, and the functionality of the collection is not dependent on the data type or physical organization used to implement it.

Script programs may be written by designers having little or no formal programming experience. Script programs may also be computer generated. For the purposes of discussing one implementation of the invention, some characteristics of a scripting language are described in Backus Normal Form below. There are 4 characteristics of a scripting language of interest in this discussion: (1) topics, (2) subjects, (3) conditions, and (4) pattern lists. A topic is program code used to process user statements. Table 1 shows one scripting language topic represented in Backus Normal Form.

TABLE 1

Topic <string> is
<Tstatement>*
EndTopic

FIG. 2 depicts three types of topics used in one embodiment: standard topics 220, default topics 240, sequence topics 260, along with individual topic instances, e.g., 202 (a–c). Standard topics 220 are used to recognize and respond to specific utterances. If more than one standard topic 202a matches an utterance, then computational mechanisms can be used to prioritize and then select one to apply in constructing a response. Two such mechanisms are specificity, which is based on the information content in the utterance, and recency, which is based on which subject most recently uttered is associated with a topic. Standard topics 220 are executed before Default 240 and Sequence 260 topics.

Default topics 240 respond to utterances when standard topics cannot respond. Two types of default topics are described. One default topic type is related to the subject of a standard topic. This type of default identifies utterances that refer to a subject when a more specific answer cannot be found. Another default topic type is a "universal" default, sometimes called a "last line of defense," which responds in the event that no other standard or default topic can respond. In the presently described embodiment, default topic items 202b are tested in the order in which they appear in the program and the first applicable default 202 is used to build the response.

Sequence topics 260 are used to recognize and respond to utterance sequences when the utterances are connected by how the user responds. Sequence topics are executed only when explicitly accessed in a script "SwitchTo" statement, which is a form of redirection. Sequence topics have the lowest priority of the three topic types described. In the presently described embodiment, sequence topic items 202c are only executed by direct reference in another topic, so their ordering is unimportant.

The body of each topic is a list of conditional blocks. These conditional blocks are executed in the order found in the topic. If the condition of a conditional block is false, execution goes on to the next conditional block in the topic, or to the next topic if there are no further conditional blocks.

If the condition is true, the commands and conditional blocks inside the block are executed, and further behavior of the program is dependent on the keyword which ends the conditional block. If it ends with "Done," execution ceases until the next input occurs. If it ends with "Continue," execution continues with the next conditional block in the topic, or the next topic if there are no further conditional blocks. If it ends with "NextTopic," the rest of the current topic is skipped and execution continues with the next topic.

TABLE 2

| <SubjectList> = Subjects <string> [,<string>]*; |
| --- |

A topic may contain one or more Subjects statements. An exemplary Subjects statement is shown in Table 2 in Backus Normal Form. Each Subjects statement asserts that the given subjects are subjects of the topic. If a non-IF command within the body of the topic is executed, all topics that share at least one Subject with the topic are added to the "focus of attention." In the present embodiment of the invention, the focus of attention includes all topics associated with subjects related to the last user utterance. Conditions within a topic can test whether a topic is included in the focus of attention. A Backus Normal Form representation of one exemplary Condition statement appears in Table 3.

TABLE 3

| <Condition> = If <conditionpatlist> Then \| |
| --- |
|     IfHeard <patlist> Then \| |
|     IfHeard <pat> [and <pat>]* [and not <pat>]* \| |
|     IfRecall <memlist> Then \| |
|     IfRecall <memref> [and <memref>]* [and not <memref>]* \| |
|     IfDontRecall <memlist> Then \| |
|     IfDontRecall <memref> [and <memref>]* \| |
|     IfChance <chance> Then \| |
|     IfChance Then \| |
|     Always |

TABLE 4

| <patlist> = <pat>[, <pat>]* \|<symbol> |
| --- |

A pattern list is a predefined script element that evaluates to a list of strings. Table 4 shows a Backus Normal Form representation of one exemplary pattern list. It can be either the name of a "PatternList" object or a list of patterns separated by commas. One common use for pattern lists is to store a list of related synonyms for use in recognizing particular user utterances.

FIG. 3 depicts an operating environment that is useful in the practice of the present invention. The environment can be characterized generally into four partitions: front end 302, a connection 310, bot processor 300, and back end 304. Front end 302 is the environment in which a user 316 of the present embodiment consults a virtual bot interface 314 via a computer 312. Computer 312 is connected to the bot processor 300 for data communication via connection 310. Connection 310 may be, for example, a network connection using the Internet, or, for example, a direct connection to bot processor 300.

User 316 often connects to a site whose interface of first impression is a virtual bot interface 314. For example, a customer visiting the home page for a "Company" website might first see and interact with a bot interface. The advantage for the site developer is that user 316 may have a help or information request that is easily handled via bot interface 314.

In the operating environment that hosts the embodiment of the present invention, bot interface 314 is an instantiation of a process that communicates with bot processor 300 via connection 310. Bot processor 300 itself may comprise bot runtime executive process 306, compiler 307, and a set of bot programs 308. Bot processor 300 also comprises a computer, such as a general-purpose computer, having a CPU, memory, and data storage devices. Such data storage devices may make use of a data storage medium to hold data values, a CD-ROM being one example. The data storage medium as well as the memory of the computer may contain digital representations of the universe of discourse, or parts thereof. The data storage medium may be removable. Such computer, CPU, memory, data storage devices, and data storage medium, are well known in the art and are not explicitly shown in FIG. 3 to avoid obscuring the drawing with unnecessary detail.

As user 316 logs onto a site having bot processor 300 via connection 310, runtime executive 306 executes an interaction routine that guides the discussion that occurs between user 316 and bot processor 300. A two way communications dialogue occurs between user 316 and bot processor 300 wherein user 316 may ask questions, make declarative statements and other normal communications patterns. Indeed, exemplary communications could be in the form of written or spoken language, graphics, URLs or the like that may be passed to and from a user to an automatic interface program, such as the present invention.

In turn, runtime executive 306 uses pattern matching to parse the statements and questions generated by the user and respond according to a set of bot programs 308. As will be discussed in greater detail, bot programs 308 are often created at the back end 304 as a set of "scripts" that the bot processor will tend to engage in with user 316. For example, if the site using bot processor 300 is a site for a reseller of personal computers, then it is advantageous that bot processor 300 be designed to handle questions and discussions concerning personal computers and their peripherals in general. Thus, the back end 304 will generate scripts that will guide the discussion concerning many computer-related topics. These script programs 308 are then compiled by compiler 307 and the compiled code is incorporated into runtime executive 306 in the presently described embodiment.

As the two-way discussions between user 316 and runtime executive 306 continue, it is generally desirable to engage in quality control of bot processor 300. This quality control is provided at back end 304 via feedback loop comprising a transcript of dialogues 318 and backtrace and state information 320 of the bot processor 300; a supervisor 322 and editor 324. As transcripts develop over the course of interacting with a user, the text of these transcripts are stored, together with the state of the runtime executive and backtrace of execution through the runtime executive code. This information forms the basis for accurately diagnosing the runtime executive and for debugging its performance. Such information may be stored electronically in a storage media or could be printed out in human readable form.

Supervisor 322 analyzes the information at 318 and 320 with the intention of optimizing the performance of the runtime executive 306. Supervisor 322 could be a human operator deciding if the semantics captured by the system needs to be upgraded in response to a dialog transcript that has occurred. If so, supervisor 322 could optionally invoke an editor 324 to edit the programs that represent the semantic framework of the runtime executive. These programs would then be re-compiled and incorporated into the runtime executive 306.

Although FIG. 3 gives a general description of various operating environments in which virtual bots may exist, it will be appreciated that many other operating environments are obvious to those skilled in the art and that the scope of the present invention should not be so limited to the exemplary descriptions as given above.

II. Bot Development

In general, a bot user knows what kind of information he seeks, but not necessarily how to articulate his request. Functionally, the implementation of the art described herein provides a bot user with the ability to interact with a bot on any level of abstraction directly associated with the universe of discourse. It is advantageous that a bot be able to achieve this either with a single response to a very specific query that immediately identifies the users' needs, or through dialog in response to a series of increasingly specific queries guided by the bot via bot programs. The mechanism is independent of the order in which topics are developed.

The presently described embodiment of the current invention implements virtual bots by designing a framework of defaults in such a way that it is unlikely for a bot to be asked an unspecific question relevant to the universe of discourse where the answer isn't relevant to the subject of the query. The structural foundation for this framework, and the interacting mechanisms associated with it, comprise the art described in the remaining sections.

A. Hierarchical Decomposition of the Universe of Discourse

In an embodiment employing the invention, a universe of discourse is described as an interrelated grouping of information/content components that are hierarchically decomposed into increasingly specialized areas of information.

Given an informational decomposition that covers the breadth and depth of a universe of discourse, the primary mechanism associated with the invention enables a particular information/content component to respond to queries in the absence of the development of specific topics. When this mechanism is implemented on every information/content component in the decomposition, a bot can provide a relevant response to any relevant query even before any specific topics are developed.

The art described herein conceptually uses hierarchical decomposition to develop a bot that has an organizational structure and is developed around a hierarchical framework of defaults. The functional component of the informational/content decomposition is called a domain. A domain represents an informational aspect, or concept, of the universe of discourse that the bot should "know" about. A domain also organizes the topics that can respond to queries directed at the concept associated with the domain. The overall content decomposition for a particular universe of discourse is called a domain hierarchy. The mechanism used to respond to domain-based queries in the absence of a topic specific to said query is called a domain default. Regardless of the user's query, or the degree of topic development, a bot developed with a domain hierarchy and domain defaults can provide a relevant answer to the user and even direct the user toward the information they seek. (Note that domain defaults are not necessarily implemented using default topics as described in FIG. 2.)

FIG. 4 depicts a domain hierarchy for a bot whose universe of discourse will be information about Company 402. The hierarchical decomposition represents the sum total of information about the Company 402 that the bot will be expected to be conversant about. Company 402 is itself decomposed into four informational components: Information 404, Products 406, Services 408, and Sales 410. The Products component 406 is shown further decomposed into three components, Widgets 412, Flingys 414, and Gadgets 416. It is noted for the purposes of discussion that the combination of components is intended to completely describe the organization.

Each component 402–416 in the Company hierarchy 400 is called a domain. This type of hierarchy is called a component hierarchy, in that the domains under the top (root) domain (i.e., Company domain 402) are considered components of Company domain 402. Thus, Information domain 404 is a component of Company domain 402. The reverse is not true (i.e., Company domain 402 is not a component of Information domain 404). A terminal domain is one that has no subdomains. All domains that aren't terminal domains, including the root domain, are termed non-terminal domains. A bot's most specific topic content is implemented in its terminal domains. Such topics are called terminal domain topics or terminal topics. The overall hierarchical decomposition 400, as previously mentioned, is called the domain hierarchy.

B. Domain Defaults

The domain default is a mechanism that enables the bot to produce a relevant response to queries on a domain prior to or in addition to topic development associated with a terminal domain. A domain default is a topic placed into the universe of discourse to provide a default response to a query that is determined to relate to the respective domain. It should be noted that domain defaults are implemented in the present embodiment using standard topics, though they could be implemented by those skilled in the art using other mechanisms, including default topics.

FIG. 5 illustrates a universe of discourse 500 for a bot designed using a domain hierarchy and domain defaults, as opposed to the largely vacant universe of discourse 100 designed using a category list that is depicted in FIG. 1. The same universe of discourse applies in both FIG. 1 and FIG. 5, but the universe of discourse is now completely divided into non-overlapping areas 502–516 that correspond to the domains in hierarchy 400. Domains 502 and 506 represent non-terminal domains in the hierarchy.

Terminal topics respond to "relevant" and "specific" queries on universe of discourse 500. A relevant query is one that "hits" a domain in universe of discourse 500 (i.e., a domain in the hierarchy). A hit means that the subject of the query matches the content area of the domain. A specific query is one that would hit a terminal domain topic. Of particular interest is a relevant but "unspecific" query, because it hits a domain in the hierarchy but not a terminal topic. Also of interest is an "irrelevant" query, where irrelevant means that the subject of the query does not match any domain subject associated with the current focus of attention, or, in the worst case, any domain in the hierarchy. Domain defaults are intended to respond to all forms of relevant and unspecific, and irrelevant, queries. Each domain area 502–516 has a domain default. Consequently, no area in universe of discourse 500 is equivalent to the universal default 106 illustrated in FIG. 1. Thus, despite the fact that no terminal topics are shown in FIG. 5, the associated bot will produce a relevant response to relevant but unspecific queries, as well as irrelevant queries. It should be noted that terminal domains will implement both domain defaults and terminal topics. It is possible that, when terminal topics are developed, the domain and terminal topics will "compete" for which will match a terminal domain query. Those skilled in the art will recognize that a variety of mechanisms can be used to address this condition. For example, the developer could simply implement fewer terminal domain topics, and design the domain defaults to provide those responses.

FIG. 6 illustrates inclusion of terminal topics into the universe of discourse 500 illustrated in FIG. 5. Universe of discourse 500 is again shown divided up into content areas 502–516 that correspond to domains 402–416, respectively. FIG. 6 also illustrates terminal topics 602 that represent the same terminal topics (Topic 1–Topic 11) that were illustrated in FIG. 1. Non-terminal domains 502 and 506 contain no topics. No order is imposed for topic development, so topics 1–11 could be implemented in any order once the domain hierarchy and its defaults are in place. Each of the various topics 1–11 are specifically associated with a terminal domain. For example, topics 1 and 10 respond to queries about Company Information (domain 504), while topic 4 responds to queries about Flingys (domain 514). An advantage of the invention is that topics are organized by the domain concept they are associated with, which improves bot maintenance and extension.

Domain defaults of the present embodiment have two noteworthy characteristics. First, the manner in which a user interacts with a bot is conversational, so a relevant user query may hit any domain in the hierarchy. This means that it is advantageous to develop domain defaults for every domain in the hierarchy or the bot user's overall sense of response relevance might be compromised. Second, the domains along a 'vertical path' in a virtual bot hierarchy are always related by content, so every domain from root domain 402 to a particular terminal domain can provide a viable degree of content for that terminal domain. As a result, a user query about widgets, and so directed at Widgets 412, if made in a vague way, could be responded to by Products 406, or even Company 402. It is advantageous for the information "dependency" between domains on a vertical path in the hierarchy to be manifested in the interactions between domain defaults. Otherwise the bot user's overall sense that the bot's knowledge of the universe of discourse is an integrated framework might be compromised.

For example, if the bot user is interested in widgets and makes what he believes is a query about widgets, the query should hit the Widgets 412 terminal domain. It is possible that the user's query will not hit Widgets 412, so domain defaults are advantageous for each of the Company, Products, and Widgets domains, because each of these domains represents information about the role of widgets in the universe of discourse to differing degrees of abstraction. Any of the following queries/comments could be issued by the bot user with respect to widgets:

Q1—"What kind of widgets do you have?"
Q2—"Widgets"
Q3—"What products do you have?"
Q4—"What do you have?"
Q5—"What products do you have?"
Q6—"Do penguins live here?"

Domain defaults could respond to these queries even if no specific information regarding widgets had been implemented. Such responses would look like the following:

Q1—"What kind of widgets do you have?"
A1—"We have red, green and blue widgets. I can show you a feature comparison chart for a particular model."
Explanation1—The query has a direct reference to widgets, but is general because it doesn't refer to a specific widget type. The response answers the question by elaborating the children domains and by helping the user select a type of information for whatever response they select.

Q2—"Widgets"
A2—"Widgets are one of our products. They are used in many industrial applications. We also manufacture and sell flingys and gadgets."
Explanation2—The query again references widgets directly, but is general because it doesn't specify what it is about widgets that is desired. A direct reference to the domain subject results in an explanation/definition of the term. It also provides information about the role the domain subject plays in the enclosing domain, i.e., Products.

Q3—"What products do you have?"
A3—"We manufacture and sell widgets, flingys, and gadgets. Would you like to know more about any of these?"
Explanation3—The query refers to widgets indirectly, hits the Products 406 domain, and is general because it doesn't refer to a specific product type. The response answers the question by elaborating the component domains and by helping the user select a type of information for whatever response they select.

Q4—"What do you do?"
A4—"I am glad you asked that. We are a small manufacturing company. We design and build the best widgets, flingys and gadgets money can buy. Would you like more information about our company, a particular product, customer service or how to purchase a product?"
Explanation4—The query actually hits the Company 402 domain, and is general because it doesn't refer to a specific aspect of company. The response answers the question and elaborates on the information organized by this domain subject.

Q5—"What products do you have?"
A5—"We manufacture and sell widgets, flingys, and gadgets. Would you like to know more about any of these?"
Explanation5—This is simply a repeat of Q3/A3 for the purposes of demonstrating the next query and response.

Q6—"Do penguins live here?"
A6—"I'm sorry, I do not understand what you mean. Weren't we just talking about our company's products?"
Explanation6—The query is so general that it is unrecognizable with respect to the universe of discourse and, accordingly, the last domain subject. The response reminds the user about what the last conversational subject was and its enclosing domain's subject.

It should be noted that all of the queries 1–6 are unspecific in the absence of any terminal domain topics to answer these queries, and that there are different types of responses to the different types of queries. Query Q1 is really a request for an enumeration of widget types, and possibly information about a particular widget type. The response provides both the information requested and provides in the response a way to help the bot user focus the next query. Query Q2 is more unspecific because only the domain name "Widgets" is mentioned in the query. The response says something about what a widget is, or maybe what role widgets play in the product lineup. Query Q3 is even more general, in that it refers to all of the products this company has. In reality, it is analogous to query Q1, only on the products domain instead of the widgets domain. The response is, again, an enumeration, this time of product types. Query Q4 appears extremely general, however it is analogous to queries Q1 and Q3, but directed at the topmost (Company) domain. Query Q5 is a repeat of query Q3 for the purposes of setting the focus of attention for query Q6. Finally, query Q6 is irrelevant to the current conversation, which is illustrated with the products domain. The response shows that the query was outside the bot's universe of discourse, but attempts to help the user by reminding the user about the previous topic of conversation, namely products and its parent domain, company.

Each of these queries is either relevant and unspecific or irrelevant. The relevant and unspecific queries hit a domain within the hierarchy along the route leading directly from the company root domain to the widgets terminal domain. Each of the responses shown represents a structured but default response that is based on the domain subject area.

C. Domain Family Relationships and Topic Types

As noted in the Q1–Q5 query-response examples above, there is variety in both the types of queries that can be made on a domain and in the associated responses a bot can make. In order to provide a smooth conversational flow, the bot says only one thing at a time, so there is a need to have more than one type of default associated with each domain. The number and type of domain defaults is based on the conceptual/informational "family relationships" a domain has in the domain hierarchy.

FIG. 7 depicts the family relationships for a generic domain 706, illustrated using the Products 406 domain from FIG. 4. There are three kinds of relationships with respect to a domain: (1) it has a single "parent" 702 (except for the root domain), (2) it has zero or more "siblings" 704, and (3) it has zero or more "children" 708. A domain's parent represents the more abstract domain of which domain 406 is a component. The parent 702 of domain 706 is illustrated in FIG. 7 as Company 402.

A domain's siblings share the same parent, and hence the same level of abstraction with domain 706 in the hierarchy. A sibling 704 of domain 706 is illustrated in FIG. 7 as Information 404. The relations between a domain 706, its parent 702, and its children 708 are depicted with a solid line owing to the direct decompositional relationships between them. The relations between a domain 706 and its siblings 704 are depicted with a dotted line because there is no direct decomposition between the two. Their relationship exists because they are both components of the same parent 702. The other sibling domains (not shown) to Products 406 would be Services 408 and Sales 410.

A domain's children constitute the information categories that comprise the domain, as components. A child (direct subordinate) 708 of domain 706 is illustrated in FIG. 7 with Flingys 414. The other children (not shown) of domain 706 are Widgets 412 and Gadgets 416.

Domain family relationships are directly associated with the types of queries and responses that can be made on a domain. There are three query/response types directly associated with family relationships: "description," "keyword;" and "reminder." An inbound query will be recognized as one of these types. The bot runtime executive is responsible for performing the query-recognition task. A description query/response is associated with queries that are relevant to the universe of discourse, unspecific, and based on the definition or children of domain 706. Queries Q1 and Q3 represent description queries, because the request is for enumeration of the topic domain's children. A keyword query/response is associated with queries that are relevant to the universe of discourse, unspecific, and not based on the domain's definition or children. The response given is based on the domain 706 and its relationship to its siblings. Query Q2 represents a keyword query since it only mentions the domain. The response talks about what the domain (Widgets 412) means and how it relates to parent 702 with respect to its siblings. A reminder query/response is associated with queries that are irrelevant to the domain that answered the user's previous query. When a query hits a domain topic, the focus of attention is set on the subject of that domain. For example, when a user makes query Q5 the focus of attention is set on "products." When a user makes query Q6 after having made query Q5, the focus of attention is now set on the subject of the Products 406 domain. Since the subject of query Q6 is irrelevant to the subject of Products 406, the response informs the user that the bot is confused. In addition, the response reminds the user what the last domain was, and its parent (Company 402, parent 702), so as to help the user clarify the next query.

Since the family query/response types provide information about the location of domain 706 in domain hierarchy 400, they can be used as a navigational aid for assisting a user in clarifying requests to the bot. These hierarchical relationships might suggest that the user knows, or needs to know, the hierarchical relationships to use the bot. Such is not the case. The hierarchical mechanisms are intended to provide completeness and coherence to the bot and how it is perceived by the user, even if the user initially knows nothing about the universe of discourse of the bot. This mechanism represents another advantage of the present invention.

FIG. 8 illustrates that family components and family-related query/answer types are implemented with three independent domain defaults. The description default 802 focuses on domain children. The keyword default 804 focuses on the domain siblings. The reminder default 806 focuses on the domain parent. Together, the description (child), keyword (sibling), and reminder (parent) defaults comprise the domain defaults. In one embodiment of the present invention domain defaults are implemented using standard topics (item 220 in FIG. 2), and are referred to herein as domain topics.

Domain topics (i.e., defaults) have an order of precedence based on the desire to 'move' a bot user closer to a terminal domain, in which a terminal domain topic can be used to fulfill their needs. Description topics 802 and keyword topics 804 respond to relevant utterances in the universe of discourse, so they have a higher precedence than reminder topics 806, which respond to irrelevant utterances. Description topics 802 are preferred over keyword topics 804 because they point downward, by talking about domain children 708. These are most likely to be asked and most likely to provide a bot user with appropriate guidance. Keyword topics 804 are the next most preferred, because they are still relevant, and they talk about domain siblings 704. Reminder topics 806 are the least preferred, and point to the parent domain 702. As will be disclosed below, the current embodiment of the invention executes domain topics in a way that maintains this precedence ordering.

III. Bot Implementation

The operating environment that hosts the current embodiment of the present invention uses NeuroScript®, which is a scripting language commercially available from NativeMinds, Inc., San Francisco, Calif., to implement bot programs (item 308 in FIG. 3) and NeuroServer®, which is commercial bot server software available from NativeMinds, to implement the bot runtime executive (item 306 in FIG. 3). It will appreciated by those skilled in the art that implementations employing the current invention need not be made using NeuroScript or NeuroServer, and that other mechanisms could be employed.

A domain hierarchy is implemented with a data management structure that mirrors the domain names and relationships of the hierarchy. In the present embodiment, a file system including hierarchical directory support is the data management structure. Others may be used. Every domain in the hierarchy represents a directory by the same name in the file system. Such a directory serves as a logical storage area for the associated domain. Both domain and terminal topics are implemented in files. Domain topics are implemented in a file in the domain-name directory. Terminal topics are implemented in a file in terminal domain directories. Thus terminal domains have two files, one each for domain and terminal topics. Using a hierarchical decomposition of the universe of discourse and a corresponding data management structure represents advantages of the present invention in ease of topic organization and maintenance.

Domain topics are implemented with NeuroScript using standard topics as described in FIG. 2. Standard topics are also used to implement terminal topics. As a result, computational mechanisms are required to distinguish and select between the two topic types. Three such mechanisms, focus of attention, specificity, and recency, have already been described. Advantageously, terminal topics are developed to be more specific than any domain topics, because the domain topics are there to provide answers when terminal topics do not exist. In addition, description topics are developed to be more specific than keyword topics, which will be more specific than reminder topics. Below is a description of some possible implementations of the description, keyword, and reminder domain topics, followed by a description of implementation mechanisms used to maintain domain hierarchies.

FIG. 9 illustrates a domain hierarchy 900 similar to that presented in FIG. 4, but expanded to include the Education 918 and Training 920 domains, and their children. FIG. 9 will be used to illustrate domain topic implementations in the following sections.

A. Description Topics

One of the functions of the bot runtime executive in this embodiment is to parse types of questions from input text. Description topics, such as the one represented by description topic 802 in FIG. 8, are triggered by description or fact-based queries (i.e. yes/no questions) to a bot. For example, if a bot user makes query Q7 (appearing below) the bot recognizes it as a description question on an Education domain, in that it basically asks for a description of what is available. Description questions can generally be answered with an enumeration. If the bot user makes query Q8 (appearing below), the bot recognizes it as a factual question. Factual questions can generally be answered yes or no. Both Q7 and Q8 represent relevant but unspecific domain queries, and both can be answered by similar responses, so the same description topic is used to construct the response.

Q7—"What educational programs do you have?"

A7—"We have an employee reimbursement program for degree programs. We also have in-house training for non-degree certification programs."

Explanation7—As with Q1 and Q3 this relevant but unspecific query represents a request for a description of what is available. The answer provides an enumeration.

Q8—"Do you have an employee reimbursement programs?"

A8—"We have an employee reimbursement program for degree programs. We also have in-house training for non-degree certification programs."

Explanation8—This query is relevant and unspecific but is asking for a yes/no answer. The response is the same as in A7, but still provides the desired answer.

In NeuroScript, fact and description question types are identified by the parser using the keywords ?FactQuestion and ?DescriptionQuestion, respectively. In queries Q7 and Q8 a description topic 802 for the appropriate domain responds. In both queries, the question is unspecific, because the bot user doesn't actually ask for information on a specific program, so a terminal topic cannot respond. But the bot can help the bot user out, by elaborating what kinds of educational programs the company has. The user can then clarify their request, and the bot provides a topical response, an advantage compared to bots developed without a domain hierarchy and its associated domain topics. Table 5 contains an example illustrating the NeuroScript for an "Education" domain description topic that could respond to queries such as Q7 and Q8.

TABLE 5

Topic "Random description or fact question about Education" is
Subjects "Education";
If (?DescriptionQuestion contains DOM_EDUCATION) or
(?FactQuestion contains DOM_EDUCATION)
Then
SayToConsole "Trace -- Education, Description answer";
Example "what kind of ducks swim in Education pool?";
Say "Talk about Education and, in particular," +
"with respect to the children: Science Engineering Business";
Done
EndTopic It should be noted that the subject of the topic, "Education," is the same as the domain name 918 in the hierarchy and the domain directory name in the file system. The pattern list DOM_EDUCATION (as described in the background section), which is also based on the domain name, is initially implemented with a single element that is the name of domain 806. During bot development, DOM_EDUCATION might be extended to include synonyms for education, such as "courses."

B. Keyword Topics

Keyword topics, such as the one represented by keyword default 804 in FIG. 8, are triggered by direct reference based queries to a bot. For example, if a bot user makes a query such as Q9 or Q10, the bot recognizes it as a direct reference to the Education domain (i.e., contains the word "Education" or another member of the pattern list DOM_EDUCATION) and responds in two ways: (1) pseudo definition, and (2) information about siblings, as exemplified by the response to queries Q9 and Q10.

Q9—"Education"

A9—"We have degree and certification educational programs here. We also have stock participation, health insurance, paid holidays and retirement benefits for employees."

Q10—"Where can I get education about advancement in your company?"

A10—"We have degree and certification educational programs here. We also have stock participation, health insurance, paid holidays and retirement benefits for employees."

The keyword topic 804 for the Education domain matches a reference to the domain subject, "Education," so both queries Q9 and Q10 will be responded to by the same topic, even though Q9 is very general and Q10 is very specific. The keyword topic is thus more general, (i.e., more broadly applicable) than the description topic. In some cases, as in query Q9, perhaps only the domain subject is provided in the query. In other cases, such as in query Q10, the query may be complex, but the only thing recognizable by the bot in the absence of a terminal topic that answers Q10 is the direct reference. The bot does not direct the bot user downward, because a direct reference does not provide any navigational directive, but it can provide a little information about education in the context of the universe of discourse, and it can provide the user with some information about how education fits into the parent domain by talking about its siblings. The response to query Q9 indicates that, if the bot user is confused, providing some information about how education fits into the company's benefits programs might help them to restate their query with greater clarity. Also notice, in the response to query Q10, that a direct reference can lead to responses that do not satisfactorily answer the user's question.

TABLE 6

Topic "User mentions Education, by itself" is
Subjects "Education";
IfHeard DOM_EDUCATION
then
Example "Education";
SayToConsole "trace -- Education, Keyword answer";
Say "We have educational support for employees wishing to," +
"further their professional growth in degree-granting" +
"programs. We also have training programs that lead to" +
"certification rather than degree objectives.";
Done
EndTopic Table 6 shows another example of Neuroscript. Again, the domain name is the subject of the topic. In NeuroScript, direct references are parsed using the "If Heard" mechanism. In the keyword topic, the "If Heard" mechanism is applied to the domain pattern list, "DOM_EDUCATION." The specificity of the topic is based on both the pattern being matched ("DOM_EDUCATION") and the matching condition ("If Heard"). "If Heard" is less specific than pattern matching conditions involving either "?DescriptionQuestion" or "?FactQuestion," so the keyword topic will not be selected if the description topic is applicable.

C. Reminder Topics

Reminder topics, such as the one represented by reminder default 806 in FIG. 8, are triggered by queries to a bot that have nothing to do with the current focus of attention. For example, if a bot user previously made a query about education, then education is likely the current focus of attention. If the user then makes a query such as Q11, the bot recognizes that the subject of the query isn't education, and so is irrelevant. When the query is irrelevant, the reminder topic responds, as shown in the response to query Q11 below:

Q11—"Can I paraglide off the cliff in your back yard?"

A11—"I am confused, what you have said is either too complicated for me to understand, or I cannot see the relationship to our last topic, which was Education or Services."

There are any number of possibilities of why the bot user's current query is unrecognizable. When this occurs the bot uses the reminder topic to tell the user that it does not understand what the user said, and reminds the user that the last topic of conversation was about education, but adds focus to the parent domain "Services."

TABLE 7

Topic "We are baffled, but the last topic was Education" is
Subjects "Education";
If Focused
Then
SayToConsole "Trace -- Education, Reminder response";
When Focused Example "Do you go sledding on winter mornings?";
Say "I am confused, what you have said is either too complicated" +
"for me to understand, or I cannot see the relationship to" +
"our last topic, which was Education or Services.";
Focus Subjects "Services";
Done
EndTopic In the code example shown in Table 7, there is no matching condition, so the topic has no specificity. It will thus never execute if either the description or keyword topics are able to execute, or if a terminal topic in another domain is able to execute. Note that there is an "If Focused" statement in the NeuroScript. The subject "Education" can only have been focused by a previous query to a domain whose subject list includes "Education," which means that the topic shown in Table 7 will only be executed if the last query was within the "Education" domain. The bot thus keeps track of where the conversation is with respect to the hierarchy, so when it gets a confusing query, its response helps the user to refocus the conversation. The education domain 918 is again referenced in the response, along with the parent domain (services 908), but the parent domain is added to the focus [of attention] list. This new focus has the effect of pushing the focus of attention further up the hierarchy if a second irrelevant query follows the first. Cases of non-relevance, such as query Q11 above, illustrate an advantage of the invention that it doesn't "give up" on the user, and that it provides the user with useful information about why there is confusion.

It has been noted that the universe of discourse illustrated in FIG. 5 has no direct correspondence to the universal default 106 of FIG. 1. It will be noted that the reminder topic of root domain 502 of FIG. 5 most closely duplicates the functionality of the universal default 106 of FIG. 1. If the user repeatedly makes irrelevant queries, they will eventually hit the reminder topic of root domain 502.

Because domain topics perform the same tasks for every domain in a domain hierarchy, they differ only in name, thus allowing the use of iteration through the hierarchy to create and maintain them. This shows a further advantage of the present invention.

D. Domain Interactions

A domain hierarchy represents an information framework associated with a universe of discourse. Domains are hierarchically related through their family relationships, and their domain topic say statements refer to their family members directly. This connectivity can be adversely affected when domains are added, removed, renamed, or are duplicated in the hierarchy. Such operations will be referred to as inter-domain interactions, and they affect the content of domain topic say statements. Two such interactions are noted: (1) changes to the number of domains in a hierarchy, and (2) interactions between the domain names across major branches of a hierarchy.

1. Domain Hierarchy Content Changes

The structure of a domain hierarchy suggests changes to the content of domain topics when family members change. The development of a bot in the current embodiment can result in four types of change: (1) a domain is added to the hierarchy, (2) a domain is removed from the hierarchy, (3) a domain name is changed, and (4) a domain is censored from responses in the hierarchy. In the first two cases, the number of components under a parent domain increase, or decreases, respectively, and this mandates changes to the description and keyword topic say statements. For example, in FIG. 9, if two new domains were added under Services 408 in FIG. 4, called Education 918 and Training 920, then the description topic for the services domain needs to be modified to include Education and Training domains. In addition, it is advantageous that the Education domain keyword topic be modified to include the Training domain, and vice versa.

2. Domain Censoring

Domain censoring refers to the act of modifying the domain topic say statements so that they do not respond with specificity in accordance with the domain they are in, but, rather, respond with specificity in accordance with another domain further up in the hierarchy. In other words, a domain topic emulates the lesser degree of specificity normal for a response of a domain topic above it in the hierarchy. This action effectively shunts all queries below a certain domain back to that domain. In the current embodiment of the invention, two scenarios exist wherein domain censoring is employed. The first scenario is where the bot administrator chooses to restrict the universe of discourse with respect to a generic domain hierarchy. For example, in hierarchy 400 illustrated in FIG. 4, the bot administrator may choose to censor the domain defaults for the Services domain without changing the structure of the hierarchy, because in the universe of discourse for which he is implementing the bot, it is not desired to respond to queries about services (even though they may exist in the physical embodiment of the universe of discourse).

The second scenario is where the bot administrator chooses not to restrict the universe of discourse, but the topic development for a domain subtree (i.e., a child domain of a particular domain and all of the child's subordinates) is incomplete. During bot testing, for example, perhaps some of the terminal topics under Services are incomplete, so rather than have the bot respond inaccurately, the bot administrator censors the Services subtree.

FIGS. 10 and 11 depict the interactions in domain hierarchy 900 associated with domain censoring. A censoring operation recursively replaces all three domain topic say statements with a single say statement that refers back to the root domain in the censoring (called the censor root domain). In this example, the censor root domain is illustrated with the Products 906 domain. FIG. 10 shows the direct effects of censoring on the subtree under a censor root. Each domain topic inside the shadowed triangle 1000 refers back to the Products 906 domain. This is illustrated by the arrows 1002 in the figure. The censoring Say statement is the same for each domain topic type inside the triangle, and will be illustrated with a description topic for the Widgets 912 domain. It should be noted that the format of the domain topics remains the same. Only the say statement content is modified.

TABLE 8

Topic "Random description or fact question about Widgets" is
Subjects "Widgets";
If (?DescriptionQuestion contains DOM_WIDGETS) or
(?FactQuestion contains DOM_WIDGETS)
Then
SayToConsole "Trace -- Widgets, A answer";
Example "what kind of ducks swim in Widgets pool?";
Say "I'm not trained to talk about Products at this" +
"time, sorry.";

TABLE 8-continued

Done
EndTopic

Regardless of which domain topic in the censor root's subtree matches a user's query, the response should be the same. They point back to Products 406 through the textual content of the Say statement, similar to the one shown in the NeuroScript example shown in Table 8.

FIG. 11 depicts how a domain's family members are affected by a censoring process. When one or more (of possibly many) child domains under a parent domain are censored, it is advantageous that the parent domain's description topic be modified to remove the affected censor root (child) domain name, as illustrated by arrow 1102. In is also advantageous to remove the censor root domain name as a sibling name in the other sibling's keyword topics, also illustrated by arrow 1102. In the current implementation, domain censoring can automatically be performed, reversed, and reperformed using a different censor root domain, repeatedly, without adversely affecting the hierarchy domain content.

3. Domain Tiebreakers

There is a certain degree of redundancy in any well-designed domain hierarchy. Many instances can arise in the development of a hierarchy where domain topic subjects and pattern lists in different hierarchy branches "clash," meaning that they will contain one or more of the same values. In NeuroScript, only one topic can respond at a time, so only one of perhaps many clashing topics will have its say statement executed. In cases where domain clashes are identified, it is advantageous to design a bot to implement what is termed a "tiebreaker." The tiebreaker redirects control to a sequence topic (item 260 in FIG. 2). The sequence topic directs the bot user to select from the different clashing subjects, the content for which comes from the say statements of the affected domain's domain topics. The query sequence Q12 and Q13 illustrate the need and use of domain tiebreakers.

Q12—"Do you have any widgets?"

A12—"I have information both about widget types and about widget inventories. Which would you like to know more about?

Q13—"Inventories."

A13—"I can tell you what our widget inventory is currently, and I can direct you to sales if desired."

Explanation12—The bot user asks something that can be matched in multiple domains. The response tries to get the user to select one of the conflicting domains, and then responds topically based on the specialization provided.

The conversational sequence illustrated in Q12 and Q13 illustrates how a domain tiebreaker might be applied. The query in Q12 is too general for the bot to select a single domain topic, because multiple domains can respond. This triggers the sequence topic, which provides the user with an explanation and a request for one of the clashing domains. If the user responds in the selection list, then a particular say statement is provided as a response, and the subject of that domain is added to the focus of attention.

FIG. 12 illustrates an example tiebreaker scenario between two domains relating to "Widgets," one of which is a component of the "Products" subtree, while the other is a component in the "Inventory" subtree, where hierarchy 1200 is a modification of hierarchy 400 illustrated in FIG. 4. In each case the meaning of "Widgets" is slightly different, but the bot would match on the word "widgets," and so "widgets" would be a member of each of the pattern lists for topics in these domains. The sequence topic informs the bot user that it knows about 'widgets' in a number of contexts, and asks the user to select one and continue. This way; it becomes clear that the bot recognizes that the user is making a general query but perhaps isn't aware that the query can be responded to in different ways. The sequence topic is intended to help the bot user obtain an answer to the query without making assumptions as to which of the domains the query references. The Say statements in the tiebreaker may be copied from the description and keyword domain topics (802 and 804) directly, though they need not be. The NeuroScript example of Table 9 shows how the domain tiebreaker for a description topic is implemented in the current embodiment of the invention.

TABLE 9

Topic "Tiebreaker A for PatternList WIDGETS" is
Subjects "Widget Types", "Widget Inventories";
If Heard "widget#"
Then
Switch To "Sequence Desc Tiebreaker for PatternList Widgets";
Done
EndTopic
Sequence Topic "Sequence Desc Tiebreaker for PatternList Widgets" is
Always
SayToConsole "Trace -- Widgets Tiebreaker, Desc sequence answer";
Say "I have information about widget <I> Types and widget" + "<I>Inventories</I>." Which would you like to know more" + "about?";
WaitForResponse;
IfHeard DOM_WIDGETTYPES
Then
SayToConsole "Trace -- Widgets Tiebreaker, Desc" + "information answer";
Say "I can tell you what kind of widgets we have, and" + "provide information about particular models.";
Focus Subjects "Widget Types";
Done
If Heard DOM_WIDGETINVENTORY
Then
SayToConsole "Trace -- Widgets Desc Tiebreaker," + "inventory answer";
Say "I can tell you what our widget inventory is" + "currently, and I can direct you to sales if" + "desired";
Focus Subjects "Widget Inventories";
Done
Otherwise Always
SayToConsole "Trace -- Widgets Desc Tiebreaker, otherwise" + "always answer";
Say "I thought we were talking about widgets, but anyway . . .";
InterruptSequence;
Done
SwitchBack
EndTopic Note that the tiebreaker has multiple subjects corresponding to the domains that clash in the hierarchy which are handled by the tiebreaker. Second, the recognition mechanism for the tiebreaker is an "If Heard" mechanism. If executed, control is switched to the sequence topic. The sequence topic requests the bot user to select between the two clashing subjects and waits for the user's response. If the user selects one of the pattern lists, then the response is taken from the associated domain's topics, and that domain's subject is focused. If neither of the pattern lists is heard, then a tiebreaker default is issued as a response and the sequence is terminated with an InterruptSequence statement. The SwitchBack statement at the end of the sequence ensures that the sequence topic will return to the SwitchTo statement which initiated the process.

IV. The Process of Implementing a Hierarchy-Based Bot

FIG. 13 illustrates one method of developing a universe of discourse for a bot. The process is roughly divided into two segments, one for constructing a functional domain hierarchy 1302, and the other for completing the functional bot 1314. The process begins with a hierarchical design of the universe of discourse 1304. Here, a set of domains are identified making up a hierarchical decomposition of the universe of discourse. This is followed by the development of a file system that mirrors the hierarchy 1306, and will be used to organize and maintain the script files. Once the organization is complete the domain topics for each domain 1308 are created. In order to test and verify the domain topics, the domain-specific pattern lists 1310 are created and the say statements are iteratively developed until they have the proper response style. It is then advantageous for the developer to identify domains that clash and would be considered for domain tiebreakers 1312. At this stage the hierarchy could be functional and broadly applicable.

Once the domain hierarchy is in place and functional, further efforts are directed at the specific universe of discourse for a particular bot. The first step is to perform any necessary censoring 1316. Implementation of the tiebreakers that are identified 1312 may advantageously be delayed until after the censoring process 1316, because some of the domain clashes may be eliminated through the censoring process. Tiebreakers may need to be reviewed if a domain censoring is undone or redone with a different censoring root. At this point the hierarchy is functional for the specific universe of discourse the bot will be conversant about.

The final, iterative, stage involves the development of terminal topics 1318, their pattern lists 1320, and any temporary censoring 1322 associated with the bot testing process while terminal topics are being developed.

It should be noted that the hierarchical organizational structure of bots enables the development and construction of a bot as a single structure that can be collected into a library and be copied, sold, and maintained as such on, for example, a storage medium. An advantage of a comprehensive bot development tool is the ability to construct bots and maintain/use bot libraries in this form.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed:

1. A computer implemented method for establishing a universe of discourse for a bot performing natural language interaction, comprising:

identifying by compositional analysis a set of domains related by hierarchical decomposition to describe a universe of discourse, wherein each child domain in the hierarchy represents at least a portion of the universe of discourse of its parent domain;

establishing a data management structure in computer-readable storage having a domain storage area for each domain of the set of identified domains;

storing one or more domain topics in each domain storage area; and wherein at least one said domain topic has information for directing a response by a bot for natural language interaction.

2. The method of claim 1 further comprising creating a pattern list for one or more domains in the identified set of domains, each said pattern list including information for relating one or more words with a domain topic.

3. The method of claim 2 further comprising creating one or more domain tiebreakers.

4. The method of claim 1 further comprising creating a pattern list for each domain in the identified set of domains, each said pattern list including information for relating one or more words with a domain topic.

5. The method of claim 4 further comprising creating one or more domain tiebreakers.

6. The method of claim 1 further comprising modifying at least one domain topic to censor the respective domain.

7. The method of claim 1 wherein the data management structure reflects the hierarchical relationship among the domains in the identified set of domains.

8. The method of claim 7 further comprising creating a pattern list for one or more domains in the identified set of domains, each said pattern list including information for relating one or more words with a domain topic.

9. The method of claim 8 further comprising creating one or more domain tiebreakers.

10. The method of claim 7 further comprising creating a pattern list for each domain in the identified set of domains, each said pattern list including information for relating one or more words with a domain topic.

11. The method of claim 10 further comprising creating one or more domain tiebreakers.

12. The method of claim 7 further comprising modifying at least one domain topic to censor the respective domain.

13. A data storage medium for holding some or all of a universe of discourse for a bot performing natural language interaction, comprising:

a first set of recorded data values representing a first domain within a universe of discourse;

a second set of recorded data values representing a second domain within the universe of discourse wherein the second domain has a parental relationship to the first domain within a hierarchical decomposition;

a third set of recorded data values representing a third domain within the universe of discourse wherein the third domain has a sibling relationship to the first domain within a hierarchical decomposition;

a fourth set of recorded data values representing a fourth domain within the universe of discourse wherein the fourth domain has a subordinate relationship to the first domain within a hierarchical decomposition; and wherein each of said sets of recorded data values includes information for directing the output of a response by a bot for natural language interaction.

14. The data storage medium of claim 13 wherein the first, second, third, and fourth sets of recorded values are organized within a data management structure reflecting the hierarchical relationship among them.

15. A computing system for implementing a bot performing natural language interaction, comprising:

a CPU;

a memory comprising a first set of values representing a first domain within a universe of discourse for the bot, a second set of values representing a second domain within the universe of discourse wherein the second domain has a parental relationship to the first domain within a hierarchical decomposition, a third set of values representing a third domain within the universe of discourse wherein the third domain has a sibling relationship to the first domain within the hierarchical decomposition, and a fourth set of values representing a fourth domain within the universe of discourse wherein the fourth domain has a subordinate relationship to the first domain within the hierarchical decomposition; and wherein each of said sets of values includes information for directing the output of a response by a bot for natural language interaction.

16. The computing system of claim 15 wherein the memory further comprises information indicating the hierarchical relationship among first, second, third, and fourth sets of values.

17. The computing system of claim 16 wherein the first set of values comprises instructions for selecting a response related to the fourth domain preferentially over the second and third domains.

18. The computing system of claim 17 wherein the first set of values further comprises instructions for selecting a response related to the third domain preferentially over the second domain.

* * * * *